United States Patent Office.

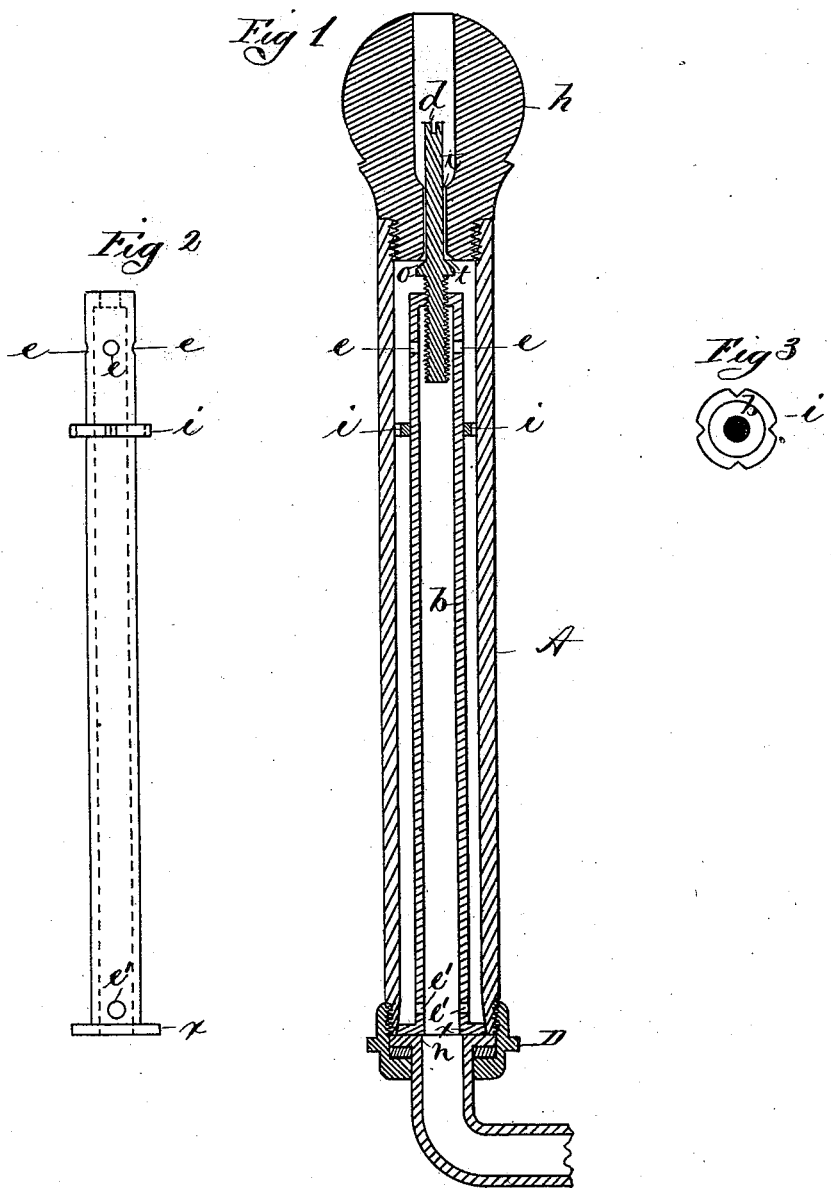

WATERMAN D. BRISTOL, OF SPRINGFIELD, MASSACHUSETTS, ASSIGNOR OF ONE-HALF TO WILLIAM H. THOMPSON, OF SAME PLACE.

AIR-VALVE FOR STEAM-RADIATORS.

SPECIFICATION forming part of Letters Patent No. 236,393, dated January 4, 1881.

Application filed September 18, 1880. (No model.)

*To all whom it may concern:*

Be it known that I, WATERMAN D. BRISTOL, a citizen of the United States, residing at Springfield, in the county of Hampden and State of Massachusetts, have invented new and useful Improvements in Self-Acting Air-Valves for Steam-Radiators, of which the following is a specification.

My invention relates to air-valves which are attached to steam-radiators for automatically operating to let the air out of the radiators when steam is let on, and to close when the radiator shall have become filled with steam; and the object thereof is to provide an air-valve for this purpose which is sensitive to the change of temperature, and which will operate automatically, and without permitting any overflow of water.

I attain the above-named object by the construction and devices illustrated in the accompanying drawings, in which—

Figure 1 is a view of my improved air-valve in vertical section. Fig. 2 is a side elevation of the expansion-tube. Fig. 3 is a view, looking down upon the top end, of the expansion-tube, Fig. 2.

A is the outer tube or case of the valve. $b$ is the expansion-tube. $i$ is a notched flange on tube $b$. $e\ e\ e$ are holes in the side of said tube near its upper end, and $e'$ is one of two holes in its side near its lower end. $d$ is an adjustable valve-stem. $o$ is a valve on stem $d$. $h$ is a perforated ball, adapted to be secured to tube A by a screwed neck, as shown. $n$ represents the flange on the end of a radiator connecting-pipe and a portion of said pipe. $t$ is an air-passage between the sides of valve-stem $d$ and the sides of the hole through ball $h$, into which stem $o$ projects, as shown. D is a union-nut fitted onto tube A.

I construct my air-valve by fitting the nut D to the lower end of tube A, making the latter of any suitable metal, and by fitting the ball $h$ to be screwed into the upper end of tube A, as shown.

I make the expansion-tube $b$ of brass, or of any metal which expands more under heat than the outer one, and in the form shown, with a flange, $x$, on its lower end, a notched flange, $i$, just below its upper end, and having holes $e\ e\ e$ perforated in its side near its top end, and holes $e'\ e'$ in its sides near flange $x$, close to its lower end. The interior diameter of tube $b$ is reduced at its upper end to form an inwardly-projecting flange, which is tapped to receive the screw-threaded adjustable valve-stem $d$.

The valve-stem $d$ is made, as shown, with a somewhat long end, which screws into the top end of the expansion-tube $b$, having valve $o$ formed thereon about midway between its ends, and said stem has a slot cut across its upper end to adapt it to be turned by a key fitting it, or by other suitable means. The perforated ball $h$ receives the end of the valve-stem into the passage through it, but leaving an air-passage up around said stem. The edge around the lower end of the air-passage through the ball is properly formed to make a seat for valve $o$ on stem $d$.

The lower end of tube A is slightly enlarged to receive within it the flange $x$ on the bottom end of tube $b$, which fits closely into said enlargement, its outer face coming about flush with the end of tube A. The nut D, provided with a proper washer, has the end of the pipe with flange $n$ on it passed through it, bringing the washer under the flange, and the nut is then screwed onto the lower end of tube A. Thus the valve is firmly connected to the inlet-pipe, and tube $b$ is held firmly in position within tube A. Flange $i$, on tube $b$, is made of slightly less diameter than that of the interior of tube A, and has notches in its periphery, as shown. The valve-stem $d$ is screwed well down into the upper end of tube $b$, as shown, and when ball $h$ is screwed into place in tube A room is left between its lower portion and the top of tube $b$ for the requisite adjustment of valve $o$ relative to its seat.

The operation of my valve is as follows, viz: Upon the admission of steam into a radiator to which the valve is attached, causing the air within it to rush out, the valve-stem $d$ is screwed down so as to carry valve $o$ away from its seat, letting the air blow up through passage $t$ and escape at the top of ball $h$, and the valve is left at such a distance from its seat as the upper end of tube $b$ will move up under the expansive influence of heat of the steam when it shall have displaced the air and filled the radiator, thus causing the expansion of tube *b* to close the passage *t* and prevent any considerable amount of steam from escaping. As soon as steam commences to fill the radiator it will flow upward in tube *b*, flowing more freely in the direction of the top end of it on account of the greater number of openings *e* at that point and of the air-vent through plug or ball *h*, and almost instantly that steam fills tube *b*, the heat thereof causes it to expand, operating valve *o*, as aforesaid, so that neither steam nor air can escape. Just previous to the closing of said air-passage a slight flowage of condensed steam will take place up through passage *t*, causing a small quantity of water to be deposited in the passage through the ball above the valve; but the passage is closed so quickly by valve *o* that not enough water will reach there to overflow. The air-passage *t* having been closed, as above described, the steam within tube *b* escapes through openings *e*, and striking the side of tube A condenses, and the water runs down between tubes A and *b*, finding a free passage through the notches in flange *i*, and is discharged through openings *e′ e′* into the interior of tube *b*, whence it runs down the steam-inlet pipe into the radiator. Any water that may have found its way into the air-passage in ball *h*, as above set forth, is, as soon as the valve cools slightly, drawn back into it, causing no inconvenience.

The above-described action of the valve prevents any danger from an overflow of water from the top of the valve, whereby injury may result to carpets or furniture, and when steam is shut off from the radiator, allowing it to cool, the tube *b* will contract, opening the air-passage *t* and so venting the radiator that the water therein may freely flow off.

I am aware that air valves of this class operating to close and open a valve by the action of several tubular expanding and contracting elements combined with a solid one are not new, and I make no claim to such combination; but

What I claim as my invention is—

The within-described improved air-valve, consisting of the combination of the outer tube, A, secured to a proper base-nut, D, the ball *h*, perforated vertically and having a valve-seat formed in its lower end, the expansion-tube *b*, secured by its lower end to said base-nut, and provided with steam-passages *e e e* near its top, of greater capacity than passages *e′ e′* near its lower end, and the valve-stem *d*, having thereon valve *o*, substantially as and for the purpose set forth.

WATERMAN D. BRISTOL.

Witnesses:
WM. H. CHAPIN,
H. A. CHAPIN.